US012732812B2

(12) United States Patent
Ergen

(10) Patent No.: US 12,732,812 B2
(45) **Date of Patent: *Sep. 8, 2026**

(54) CLOUD PROFILE

(71) Applicant: Boost SubscriberCo L.L.C., Englewood, CO (US)

(72) Inventor: Christopher William Krasny Ergen, Littleton, CO (US)

(73) Assignee: Boost SubscriberCO L.L.C., Englewood, CO (US)

(*) Notice: Subject to any disclaimer, the term of this patent is extended or adjusted under 35 U.S.C. 154(b) by 102 days.

This patent is subject to a terminal disclaimer.

(21) Appl. No.: 18/937,554

(22) Filed: Nov. 5, 2024

(65) Prior Publication Data

US 2025/0071547 A1 Feb. 27, 2025

Related U.S. Application Data

(63) Continuation of application No. 17/876,420, filed on Jul. 28, 2022, now Pat. No. 12,170,896.

(Continued)

(51) Int. Cl.

*H04W 12/06* (2021.01)
*H04W 8/18* (2009.01)

(Continued)

(52) U.S. Cl.

CPC ........... *H04W 12/06* (2013.01); *H04W 8/183* (2013.01); *H04W 8/20* (2013.01); *H04W 12/72* (2021.01)

(58) Field of Classification Search

None

See application file for complete search history.

(56) References Cited

U.S. PATENT DOCUMENTS 9,819,593 B1 * 11/2017 Vetter ........................ G06F 9/52
2013/0151595 A1 6/2013 Fernandez-Ruiz et al.

(Continued)

FOREIGN PATENT DOCUMENTS

EP 228359402 5/2024
WO PCTUS2250052 11/2022
WO WO2023121792 A1 6/2023

OTHER PUBLICATIONS

"Using Dual SIM with an eSIM", Apple Inc., downloaded from the Internet on Oct. 19, 2021, from https://support.apple.com/en-us/HT209044.

(Continued)

*Primary Examiner* — Fatoumata Traore

(74) *Attorney, Agent, or Firm* — Wash Park IP Ltd.; John T Kennedy

(57) ABSTRACT

A mobile device is configured for use with selected mobile services and performs operations including receiving a request to use a given selected mobile service (SMS) which facilitates virtualization of an application program, first identifying and retrieving mobile application data (MAD) associated with the SMS from a first data store and receiving the SMS. A server provides the SMS to the mobile device and the SMS provides at least one feature of the application program to a first user. The MAD facilitates providing of the SMS on the mobile device and the SMS facilitates providing of features of the application program without having the mobile device download and execute the application program. The operations may include communicatively coupling the mobile device with a wireless component (WC) which communicatively couples the mobile device with the server and first authenticating, with the WC, a subscriber identity module (SIM) for the mobile device.

20 Claims, 3 Drawing Sheets

Related U.S. Application Data

(60) Provisional application No. 63/265,955, filed on Dec. 23, 2021.

(51) Int. Cl.
*H04W 8/20* (2009.01)
*H04W 12/72* (2021.01)

(56) References Cited

U.S. PATENT DOCUMENTS

2016/0240040 A1 8/2016 Gnanasundram et al.
2018/0109624 A1* 4/2018 Jayaraman ............ H04W 12/37
2020/0050439 A1* 2/2020 Bjørdal ..................... G06F 8/61
2023/0209338 A1 6/2023 Ergen

OTHER PUBLICATIONS

Android Guest, https://support.google.com/android/answer/2865483?hl=en, downloaded from the Internet on Oct. 19, 2021.
EPO App Serial No. 22835940.2, Rules 161(1) Communication, Jul. 30, 2024.
LifeHacker, "How to Set up 'Guest Mode' on Your Android," downloaded from the Internet on Oct. 19, 2021 at https://lifehacker.com/how-to-set-up-guest-mode-on-your-android-1835913254.
PCT/US2022/050052, International Search Report and Written Opinion, Feb. 15, 2023.
U.S. Appl. No. 17/876,420, filed Jul. 28, 2022.

* cited by examiner

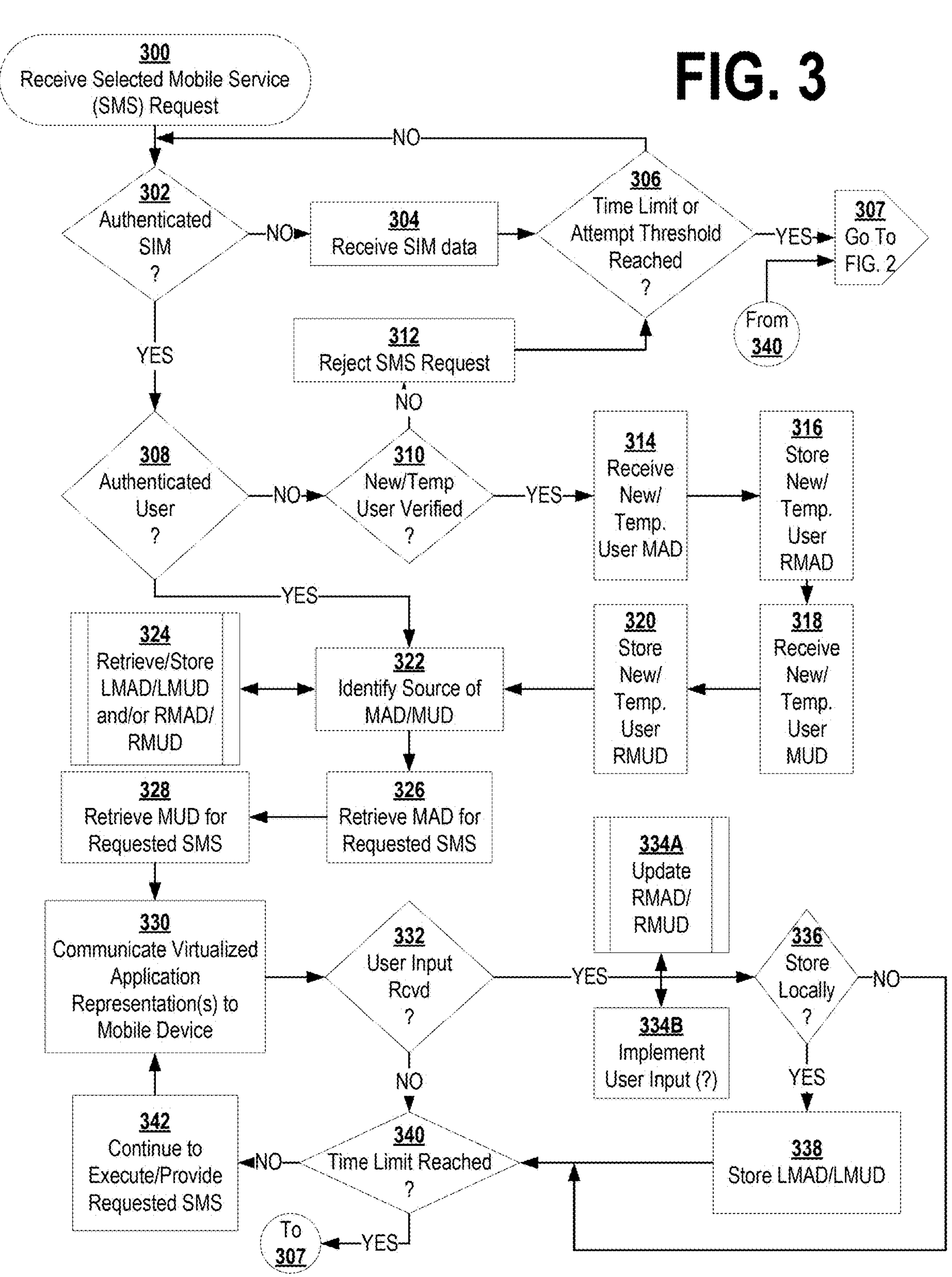
FIG. 3
300 Receive Selected Mobile Service (SMS) Request
302 Authenticated SIM ?
NO
304 Receive SIM data
306 Time Limit or Attempt Threshold Reached ?
NO
YES
307 Go To FIG. 2
From 340
312 Reject SMS Request
YES
NO
308 Authenticated User ?
NO
310 New/Temp User Verified ?
YES
314 Receive New/ Temp. User MAD
316 Store New/ Temp. User RMAD
YES
324 Retrieve/Store LMAD/LMUD and/or RMAD/ RMUD
322 Identify Source of MAD/MUD
320 Store New/ Temp. User RMUD
318 Receive New/ Temp. User MUD
328 Retrieve MUD for Requested SMS
326 Retrieve MAD for Requested SMS
334A Update RMAD/ RMUD
330 Communicate Virtualized Application Representation(s) to Mobile Device
332 User Input Rcvd ?
YES
334B Implement User Input (?)
336 Store Locally ?
NO
YES
NO
342 Continue to Execute/Provide Requested SMS
NO
340 Time Limit Reached ?
338 Store LMAD/LMUD
To 307
YES

CLOUD PROFILE

CROSS-REFERENCE TO RELATED APPLICATIONS

This application is a Continuation application of and claims priority to U.S. patent application Ser. No. 17/857,420, filed on 28 Jul. 2022 (herein, the "'420 application"), which claims priority to U.S. Provisional Application No. 63/265,955, filed on 23 Dec. 2021 (herein the "'955 application"), both applications being filed in the name of inventor Christopher William Krasny Ergen, and entitled "Cloud Profile," priority is herewith claimed to and the entire contents are herein incorporated by reference for each of the '420 application and the '955 application.

TECHNICAL FIELD

The technology described herein generally relates to devices, systems and processes for facilitating mobile device portability between two or more users.

BACKGROUND

Various commercial entities provide 3G/4G/5G, WIFI and other cellular and/or wireless communications systems for use by mobile devices, non-limiting examples including smartphones, tablets, laptop computers and other devices. Non-limiting examples of such cellular and/or wireless communications systems providers include AT&T, VERIZON, T-MOBILE and others (herein, individually and collectively being "mobile service providers"). Such providers are identified as a "wireless component (WC)."

Typically include various information is stored on "subscriber identity module (SIM)" that identifies and authenticates a mobile device as being associated with a subscriber to one or more WCs. SIM cards are commonly provided in physical forms, as a SIM-card, and in virtual forms, as an "eSIM." SIM cards typically store network/WC specific information which identifies and authenticates a mobile device for use with a WC (such data being herein "SIM Data").

Mobile devices may support use of two or more SIMs, such as two SIM cards, a SIM card with an eSIM, or otherwise. At any given time, a SIM card may be authenticated for use. The SIM associates a device with a WC and a subscriber to the WC. The subscriber may be directly associated, such as a US subscriber to AT&T Wireless, or indirectly associated, e.g., by a mobile roaming agreement such as one between AT&T Wireless and ORANGE™, which facilitates use of the mobile device when in the United Kingdom.

Once identified and authenticated for use with a given WC, the mobile device may be used by any permitted user. The permitted user may or may not be the subscriber. For example, a parent, as an AT&T Wireless subscriber, may allow their child, a user, to use the mobile device.

Mobile devices often are configured, by a user, to include features and functions that may be common or standard to a mobile device, not limiting examples including telephone services providing a user with a user interface by which the user may enter a phone number and connect with a permitted recipient, such as a 911 number or other emergency services provider (herein, a "Common Mobile Service"). A Common Mobile Service commonly accesses and utilizes data stored on the mobile device which facilitates use of the Common Mobile Service (herein, such data being "Common Data").

Common Data is often stored in firmware for a mobile device and a user typically cannot modify Common Data. Updates and/or modifications to Common Data, if any, typically provided by a mobile service provider performing a software update across multiple mobile devices of a same make, model, or the like.

Mobile devices are often further configured to include user selected features and functions such as, but not limited to, specialized voice services, text, chat, online gaming, video streaming, position determination, maps, and the like (herein, a "Selected Mobile Service"). A Selected Mobile Service may be uniquely selected by a user of a given mobile device and may access and utilize various data (herein "Mobile Application Data (MAD)") which facilitates a given Selected Mobile Service. Non-limiting examples of Mobile Application Data include computer executable instructions which, when executed, instantiate a given application program for use on a given mobile device. A given Selected Mobile Service may use Mobile Application Data specific to its service. For example, a text messaging Selected Mobile Service may be instantiated on a given mobile device using Mobile Application Data for any of a multitude of text messaging applications, such as, the SIGNAL™ application, SAMSUNG TEXT MESSAGE™ application, the FACEBOOK TEXTS™ application, and the like.

A given Selected Mobile Service also commonly utilizes user specific information to facilitate use thereof (herein "Mobile User Data (MUD)"). For example, a telephone service might include phone numbers, speed dial settings, contact lists, contacts, blocked contacts, voice messaging settings, or the like. Such Mobile User Data is commonly associated with a given mobile device user.

To facilitate use of a Selected Mobile Service, a mobile device commonly accesses SIM Data, to enable the mobile device to connect with a given WC, and Mobile Application Data and Mobile User Data to facilitate a personalized use of a Selected Mobile Service on the mobile device. The Mobile Application Data and Mobile User Data are individually and collectively identified herein as "Mobile Device Data (MDD)."

Commonly MDD is stored, by and on a given mobile device, in a local storage device, such as a non-volatile memory. While local storage of MDD facilitates stand-alone/non-WC connected access to various features and functions of a given Selected Mobile Service, local storage of MDD may inhibit sharing of a given mobile device between multiple users. For example, a parent sharing their mobile device with a child may specify a removal of the parents MDD and a loading of the child's MDD before the mobile device is configured for use by the child (in a given configuration). Local storage of MDD may also result in a duplication of data stored on a given mobile device. For example, a parent and a child may have, at least in part, common contacts, preferences, permissions, or the like. As such, local storage of MDD may result in an inefficient utilization of mobile device resources, such as data storage resources. Local storage of MDD also commonly results in a given mobile device needing to possess various data processing capabilities which instantiation of a given Selected Mobile Service. For example, for the child to view a 4K video stream, a mobile device may need to be configured to include MPEG4 video processing capabilities, while the parent may be content using a Common Mobile Service providing an HEVC video processing capability. Such conditions may result in a mobile device being limited in its capabilities and/or specify a mobile device to possess additional capabilities-thereby increasing the cost and complexity of a given mobile device.

Accordingly, the various implementations of the present disclosure address these and other non-trivial technical hurdles to provide devices, systems, and processes for facilitating mobile device portability between two or more users without requiring the pre-loading/storage of MDD on a given mobile device.

SUMMARY

The various implementations of the present disclosure relate in general to devices, systems and processes for facilitating mobile device portability between two or more users.

In accordance with at least one implementation, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

For at least one implementation, a mobile device may include a processor and a computer readable medium, coupled to the processor, including first non-transient computer executable instructions which, when executed by the processor, configure the mobile device for use with one or more selected mobile services and to perform operations. The operations may include receiving, from a first user, a request to use a given selected mobile service (SMS). The SMS may facilitate virtualization of an application program. The operations may include first identifying mobile application data (MAD) associated with the SMS and first retrieving the MAD from a first data store. The operations may include receiving, from a server communicatively coupled to the mobile device, the SMS. The SMS may be provided to the mobile device based on the server executing the application program associated with the SMS, while the application program is executed by the server, and the SMS provides at least one feature of the application program to the first user. The MAD may facilitate the providing of the SMS on the mobile device. The SMS may facilitate the providing of features of the application program to the first user of the mobile device without having the mobile device download and execute the application program. Other implementations include corresponding computer systems, apparatus, and computer programs recorded on one or more computer storage devices, each configured to perform the actions of the methods.

Implementations may include one or more of the following features. The operations may include communicatively coupling the mobile device with a wireless component (WC). The WC may communicatively couple the mobile device with the server. The operations may include first authenticating, with the WC, a subscriber identity module (SIM) for the mobile device.

For at least one implementation, the operations may include second authenticating the first user with the server executing the application program. The second authenticating may identify a condition governing the application program.

For at least one implementation, the first user may be an adult user, the condition permits use of the SMS by the first user and when the first user is a child user, the condition restricts use of the SMS.

The operations may include second identifying a mobile user data (MUD) data store, second retrieving first MUD from the MUD data store, and the second authenticating may occur based on the first MUD. The operations further may include communicatively coupling the mobile device with a wireless component (WC) and communicatively coupling the WC with a remote mobile device data store (RMDDS). The first data store may be the RMDDS and the first retrieving may include retrieval of the MAD from the RMDDS.

The operations may include second identifying a mobile user data (MUD) data store and second retrieving first MUD from the MUD data store. The operations may include second authenticating the first user with the server executing the application program. The second authenticating may identify a condition governing the application program. The second authenticating may occur based on the first MUD.

The first data store may include a local data store provided with the mobile device. The operations may include receiving a user input from the first user. The input may be responsive to at least one of the features of the application program. The operations may include communicating the user input to the server and determining whether to update the MAD based on at least one of the input and a result of an execution of the input by the server with respect to the application program.

The operations may include obtaining mobile user data (MUD) from at least one of a local data store and a remote mobile device data store (RMDDS), instructing the server to modify the MUD in view of the user input, and instructing the server to store modifications to the MUD in the RMDDS. The operations may include storing the modifications to the MUD in the local data store.

The operations may include receiving from a second user a request to use the SMS and authenticating the second user with the server executing the application program. The second authenticating may identify a condition governing use of the application program by the second user. The operations may include restricting use of the SMS by the second user when the condition restricts use of the SMS based upon an operating constraint. The operating constraint may be at least one of a user age, a time of day, a day of week, and a user location. Implementations of the described techniques may include hardware, a method or process, or computer software on a computer-accessible medium.

For at least one implementation, a system, for virtualizing representations of application program on a mobile device, may include: a mobile device; a wireless component (WC) communicatively coupled to the mobile device; a remote mobile device data store (RMDDS) communicatively coupled to the WC; and a server communicatively coupled to at least one of the mobile device, the WC and the RMDDS. The mobile device may include: a processor; and a computer readable medium, coupled to the processor, including first non-transient computer executable instructions which, when executed by the processor, configure the mobile device for use with one or more selected mobile services and to perform operations. The operations may include: receiving, from a first user of the mobile device, a request to use a given selected mobile service (SMS). The SMS may facilitate virtualization of an application program executed by the server. The operations may include first identifying mobile application data (MAD) associated with the SMS, first retrieving the MAD from the RMDDS, and receiving, from the server, the SMS. The SMS may be provided to the mobile device based on the server executing the application program associated with the SMS, while the application program is executed by the server, and the SMS provides a feature of the application program to the first user. The MAD may facilitate the providing of the SMS on the mobile device. The SMS may facilitate the providing of the feature of the application program to the first user of the mobile device without having the mobile device download and execute the application program. Other implementations may include corresponding computer systems, apparatus, and computer programs recorded on one or more computer storage devices, each configured to perform the actions of the methods.

Implementations may include one or more of the following features. The WC may first authenticate a subscriber identity module (SIM) for the mobile device, The communicative coupling of the mobile device with the server may occurs via the WC.

The operations performed by the processor of the mobile device may include: second identifying a mobile user data (MUD) data store; second retrieving first MUD from the MUD data store; second authenticating the first user with the server executing the application program; where the second authenticating identifies a condition governing use of the application program by the first user; and where the second authenticating occurs based on the first MUD. The operations may include determining, in view of the first MUD, whether the condition is satisfied; permitting the first user to utilize the feature of the application program when the condition is satisfied; and inhibiting user of the feature of the application program by the first user when the condition is not satisfied.

For at least one implementation of a system, the operations performed by the processor of the mobile device may include: receiving a user input from the first user; where the input is responsive to the feature of the application program; communicating the user input to the server; and determining whether to update the MAD based on at least one of the input and a result of an execution of the input by the server with respect to the application program.

The operations performed by the processor of the mobile device may include: obtaining mobile user data (MUD) from at least one of a local data store and the RMDDS; instructing the server to modify the MUD in view of the user input; and instructing the server to store modifications to the MUD in at least one of the local data store and the RMDDS. For at least one implementation, the MUD may identify user specific information for the first user. Implementations of the described techniques may include hardware, a method or process, or computer software on a computer-accessible medium.

For at least one implementation, a method may include: receiving, from a first user, a request to use a given selected mobile service (SMS); where the SMS facilitates virtualization of an application program on a mobile device without requiring the mobile device to execute the application program; first identifying mobile application data (MAD) associated with the SMS; first retrieving the MAD from a first data store; and receiving the SMS; where the SMS is provided to the mobile device based from a server executing the application program; where and while the application program is executed by the server, the SMS provides at least one feature of the application program on the mobile device; and where the MAD facilitates the providing of the SMS on the mobile device. Other embodiments of this aspect include corresponding computer systems, apparatus, and computer programs recorded on one or more computer storage devices, each configured to perform the actions of the methods.

BRIEF DESCRIPTION OF THE DRAWINGS

The features, aspects, advantages, functions, s, and components of the devices, systems and processes provided by the various implementations of the present disclosure are further disclosed herein regarding at least one of the following descriptions and accompanying drawing figures. In the appended figures, similar components or elements of the same type may have the same reference number and may include an additional alphabetic designator, such as 108*a*-108*n*, and the like, wherein the alphabetic designator indicates that the components bearing the same reference number, e.g., 108, share common properties and/or characteristics. Further, various views of a component may be distinguished by a first reference label followed by a dash and a second reference label, wherein the second reference label is used for purposes of this description to designate a view of the component. When only the first reference label is used in the specification, the description is applicable to any of the similar components and/or views having the same first reference number irrespective of any additional alphabetic designators or second reference labels, if any.

FIG. 3 is a flowchart illustrating a process for facilitating mobile device portability for selected mobile services between two or more users and in accordance with at least one implementation of the present disclosure.

DETAILED DESCRIPTION

The various implementations described herein are directed to devices, systems, and processes for facilitating mobile device portability between two or more users.

Figure 1:
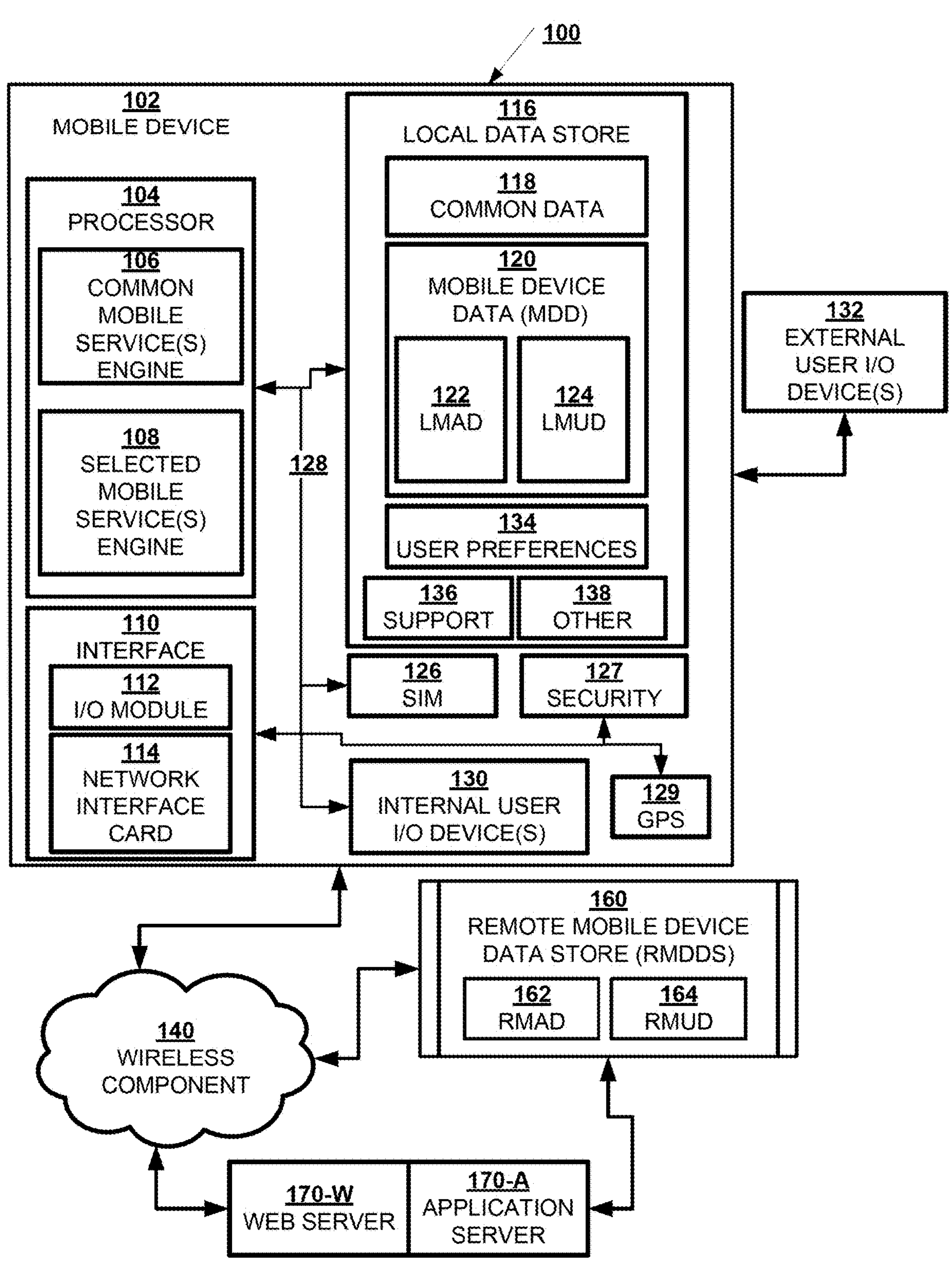
FIG. 1 is a schematic diagram illustrating a system configured to facilitate mobile device portability between two or more users and in accordance with at least one implementation of the present disclosure.

As shown in FIG. 1 and for at least one implementation of the present disclosure, a system 100 for facilitating mobile device portability between two or more users may include a mobile device 102 that is communicatively coupled to a wireless component (WC) 140, that is further coupled to a remote mobile device data store ("RMDDS") 160, and to server(s) 170 or other processing device facilitating online application functionalities. The WC 140 may include "Cloud" components.

The mobile device 102 may be a smartphone, tablet, personal computer, laptop computer, video streaming device, gaming device, or any other device configured to establish a communications link with a wireless component 140. The mobile device 102 may be coupled to the wireless component WC 140, the RMDDS 160, the server(s) 170, such as a web server 170-W and/or an application server 170-A, using any known or later arising communications technologies, with non-limiting examples including cellular communications technologies such as those implementing 3G/4G/5G technologies. For at least one implementation, the mobile device 102 may indirectly couple the RMDDS 160 and/or the server(s) 170, using cellular technologies, using the WC 140. For at least one implementation, the mobile device 102 may directly couple to the WC 140, the RMDDS 160, and/or the server(s) 170, using one or more networking communications technologies, with non-limiting examples including Ethernet, Internet, private networks, public networks, the plain old telephone service (POTS), microwave, fiber-optic, wireless, wired, cellular or other known and/or later arising networking and/or communications technologies and combinations thereof. The mobile device 102 may be communicatively coupled to one or more of the RMDDS 160 and the server(s) 170 at any given time and without having an active coupling with a WC 140.

The mobile device 102 may be configured to couple with one or more user input/output (I/O) devices including internal user I/O device(s) 130 and/or external user I/O device(s) 132 and using known or later arising technologies with non-limiting examples including WIFI radio technologies, long range BLUETOOTH technologies, normal range BLUETOOTH, cables, such as HDMI™ cables. The I/O devices may include known and later arising devices and communications technologies for coupling such devices with the mobile device 102.

As further shown in FIG. 1, the mobile device 102 includes a processor 104 configured to execute non-transient computer instructions suitably stored thereon and/or accessible to the mobile device 102 which, when executed by the processor 104, instantiate one or more of a common mobile service engine 106 and a selected mobile service engine 108. Multiple instantiations of these services may occur at any given time with respect to a given mobile device 102 and for any given implementation.

The mobile device 102 includes an interface 110 which includes a user input/output (I/O) module 112 and a network interface card (NIC) 114. The user I/O module 112 couples the mobile device 102 to internal user I/O device(s) 130, where "internal" here means provided with the mobile device 102 and not separately provided, and to external user I/O device(s) 132, where "external" here means separately provided from the mobile device 102. Non-limiting examples of user I/O devices, internal and external, include keyboards, mice, touchpads, voice response systems, speakers, microphones, displays, haptic devices, vibration devices, motion sensors, heads-up displays, earbuds, headphones, virtual reality displays, augmented reality displays, and any other known or later arising device configured to present information to a human user in a humanly perceptible format.

The mobile device 102 includes a local data store ("LDS") 116 that stores non-transient computer data and non-transient computer instructions in one or more data stores or other data storage element or using other storage architectures. Non-limiting examples of such data stores include a common data store (CDS) 118 and a mobile device data ("MDD") data store 120. The MDD data store 120 may be further identified in a hierarchical, logical or other data relationship to include stores for storing mobile application data ("MAD"), in a local MAD data store (LMADDS) 122, and mobile user data ("MUD"), in a local MUD data store (LMUDDS) 124. The LDS 116 may utilize any known or later arising data storage techniques, models, database structures, architectures, file structures, virtualizations, or the like. For at least one implementation, MAD includes aspects of given application program which facilitate user input and output operations while excluding aspects of a given application program which require non-user input/output data processing operations.

Processor (104)

The processor 104 may be configured to provide computer implemented software and hardware services including, at least one of a common mobile service engine 106 and a selected mobile service engine 108. Other computer implemented services, logics, engines or the like may be provided for other implementations. The processor 104 may be configured to provide data and/or signal processing capabilities. For at least one implementation, the processor 104 may have access to one or more non-transitory processor readable instructions, including instructions for executing one or more applications, engines, services, logics, processes and/or other known and/or later arising computing, data processing and other operations. The processor 104 executes non-transient computer readable instructions ("computer instructions") which instruct the processor to perform computer executable operations. The processor 104 may use any known or later arising processor capable of providing and/or supporting the features and functions of a given mobile device 102, for any given intended use thereof and in accordance with one or more of the various implementations of the present disclosure.

A "computer engine" (or "engine") refers to a combination of the processor 104 and computer instructions. A computer engine executes computer instructions to perform one or more logical operations (herein, a "logic") which facilitate various actual (non-logical) and tangible features and function provided by the system 100 and/or the mobile device 102, and/or combinations thereof.

"Data" (which is also referred to herein as a "computer data") refers to any representation of facts, information or concepts in a form suitable for processing by the processor 104 and which, while and/or upon being processed, cause or result in the mobile device 102 or other device(s) to perform at least one function, task, operation, provide a result, or otherwise. Computer data may exist in a transient and/or non-transient form, as determined by any given use of such computer data.

An "Instruction" (which is also referred to herein as a "computer instruction") refers to a non-transient processor executable instruction, associated data structure, sequence of operations, program modules, or the like. An instruction is defined by an instruction set. It is commonly appreciated that instruction sets are often processor specific and accordingly an instruction may be executed by a processor in an assembly language or machine language format that is translated from a higher level programming language. An instruction may be provided using any form of known or later arising programming; non-limiting examples including declarative programming, imperative programming, functional programming, procedural programming, stack based programming, object-oriented programming, and otherwise.

Any known or later arising processor may be used for the processor 104. The processor 104 may be provided by a processing device capable facilitating one or more logics by executing one more computer instructions with respect to computer data. One or more of the engines may provide the one or more services, such as the common mobile service engine 106 and the selected mobile service engine 108.

The processor 104 may include one or more physical components configured for such data processing operations. Any known or later arising technologies may be utilized in conjunction with an implementation of the present disclosure to facilitate the processor 104 and the engines, services, logics and otherwise facilitated thereby. The processor 104 may instantiate one or more computer engines and/or services as one or more threads operating on a computing system having a multiple threaded operating system, such as the WINDOWS 10 operating system, LINUX, APPLE MAC OS, ANDROID, and others, as an application program on a given device, as a web service, or otherwise. An Application Program Interface (API) may be used to support an implementation of the present disclosure. The processor 104 may be provided in the virtual domain and/or in the physical domain. The processor 104 may be associated with a give mobile device 102, as a machine process executing on one or more computing devices, an API, a web service, instantiated on the Cloud, distributed across multiple computing devices, or otherwise.

The processor 104 may be communicatively coupled, by a data bus 128 or similar structure, to other components of the mobile device 102 including, but not limited to, the LDS 116, which may also be referred to as a "computer readable storage medium."

For at least one non-limiting implementation, the processor 104 may be configured as and/or has the capabilities of a 32-bit or 64-bit, multi-core ARM based processor. For at least one implementation, the processor 104 may use one or more backend systems, such as server systems or otherwise. Computer instructions may include firmware and software instructions, and associated data for use in operating a given user device, as executed by the processor 104. Such computer instructions provide computer executable operations that facilitate one or more features or functions of a given mobile device and in accordance with one or more implementations of the present disclosure.

Common Mobile Service (CMS) Engine (106)

For at least one implementation, the processor 104 may be configured to implement computer instructions for configuring a mobile device to provide one or more "common mobile services" by a CMS engine 106. The common mobile service engine 106 is instantiated by the processor 104 executing computer instructions.

The CMS engine 106 may be configured to provide a given mobile device 102 with "common mobile services" capabilities. As used herein a "common mobile service (CMS)" refers to a communications, data processing, location determination, or other services (herein, collectively "communications services") provided by a then powered-on mobile device 102 where the identity, preferences, user specified configurations, user associated information, or the like is included for the mobile device 102 to facilitate the providing of the one or more communications services. For at least one implementation, a common mobile service is user agnostic.

As used herein, a CMS may be restricted, limited or unlimited. A CMS engine 106 may be configured to provide one or more restricted, limited, or unlimited common mobile services and/or combinations thereof. A non-limiting example of a restricted common mobile service is a default setting of a mobile device 102 which permits calls to be established with 911 services or similar emergency services numbers (herein, "911 Services") without a user having to unlock, provide a SIM card, or otherwise specifically configure a mobile device 102 for use with 911 Services.

Non-limiting examples of limited common mobile services include: various time based functions, such as where a time presented on a mobile device 102 is automatically updated; connection based services, where a mobile device identifies and seeks to connect with WCs 140 within range of the mobile device 102 whenever mobile services are enabled on the mobile device 102; location based services, such as where a location of a given mobile device 102 is determined without user input and regardless of an identity or association of the mobile device 102 with a given one or more users, and others. Any known or later arising limited common mobile service may be supported by the common mobile service engine 106 for at least one implementation of the present disclosure.

For at least one implementation, a CMS engine 106 may be configured to provide one or more unlimited common mobile services when a SIM card (physical or virtual/eSIM) is installed in the mobile device 102 and a user of the mobile device 102 is not specifically then identified to the WC 140 as a then occurring user of the mobile device 102. As used in such context, a CMS engine 106 may be configured to utilize information provided by the SIM card to facilitate use of WCs 140 within range of a given mobile device 102 for one or more restricted, limited and unlimited common mobile services. A non-limiting example of an unlimited common mobile services is a capability of a mobile device 102 to accept user inputted telephone numbers (regardless of the user's identity), such as by inputting a sequence of numbers by button, touch screen, voice, or otherwise.

In facilitating the one or more common mobile services, the CMS engine 106 may utilize common data. The common data may include data and/or instructions, and may be provided in firmware, obtained from the CDS 118, downloaded from the RMDDS 160, provided as transient data, or otherwise. Common data may include computer instructions for instantiating the CMS engine 106. One non-limiting implementation of such computer instructions is shown in FIG. 2.

Figure 2:
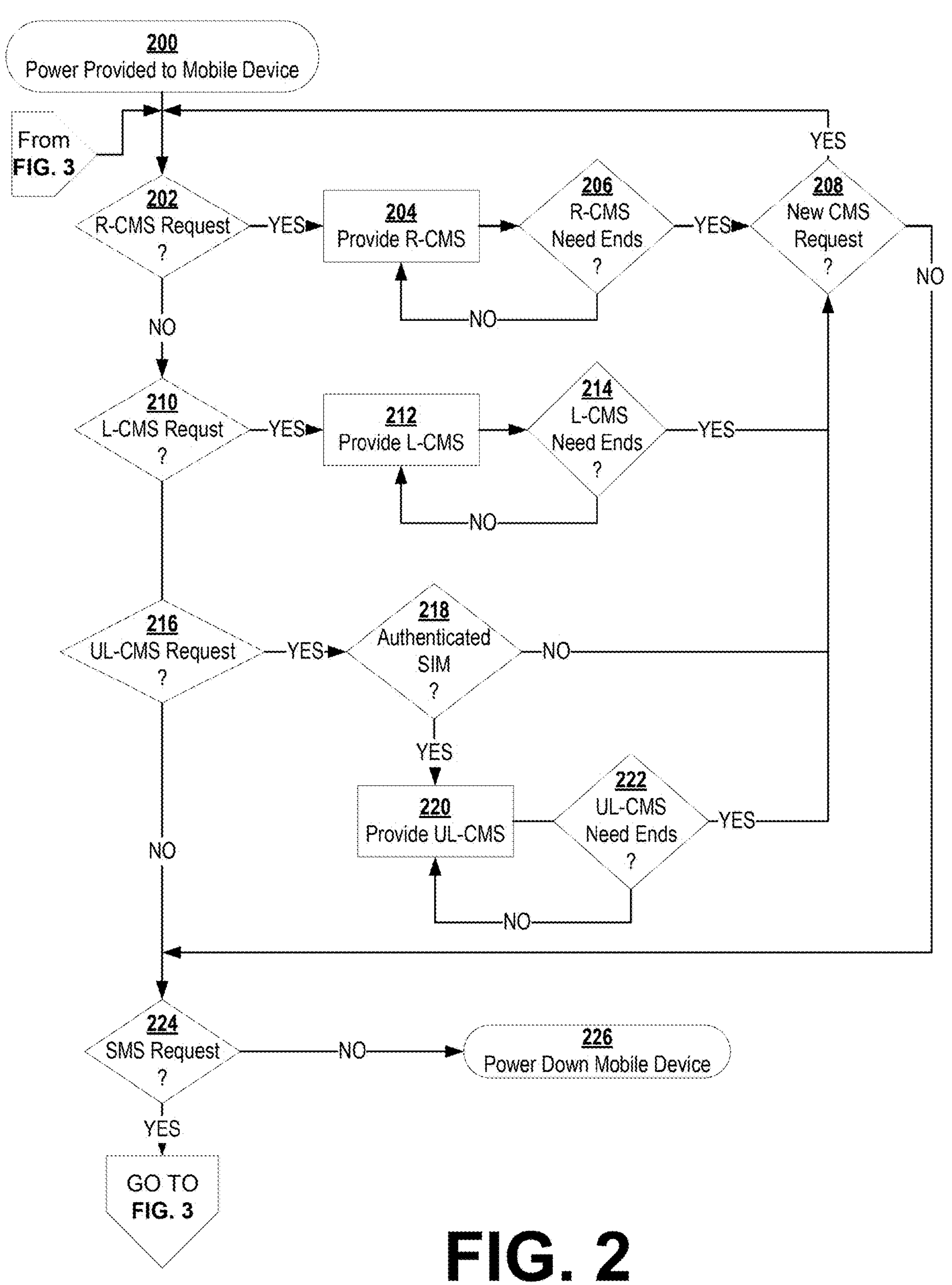
FIG. 2 is a flowchart illustrating a process for facilitating mobile device portability for common mobile services between two or more users and in accordance with at least one implementation of the present disclosure.

As shown in FIG. 2, computer instructions executed by the processor to instantiate a CMS engine 106 may facilitate operations that begin, per Operation 200, when power is provided to the mobile device 102.

Per Operation 202, the process may include determining whether a request to use a service, feature, function or otherwise of the mobile device 102 is a restricted common mobile service ("R-CMS") request. It is to be appreciated that R-CMSs, such as 911 services, may be available for use by a mobile device 102 whenever power is available to the mobile device 102 and when a WC 140 is within range of the mobile device 102. An R-CMS request may come from a user, another system or device, an automated process, or otherwise. For example, an automobile emergency reporting system, such as the ON-STAR™ service, may issue an R-CMS request when the automobile determines that it has been involved in an accident. If the request is a R-CMS request, the proceed may proceed to Operation 204, otherwise the process may proceed to Operation 210.

Per Operation 204, the process may include providing the requested R-CMS. The providing of the R-CMS may involve activation of other mobile device 102 components, system 100 components and otherwise. For example, when the R-CMS requests emergency assistance, the common mobile service engine 106 may execute one or more operations which facilitate an emergency response. Non-limiting examples of such operations may include activation of location determination devices, such as Global Positioning Services components, activating microphones, speakers, cameras, sensors, or otherwise.

Per Operation 206, the process may include determining whether the need for the R-CMS has ended or continues. If the need continues, the process may continue at Operation 204. If the R-CMS need has ended, the process proceeds to Operation 208.

Per Operation 208, the process may include determining whether a new CMS request has been received. If yes, the process may continue with Operation 202 and a determination of whether the new request is an R-CMS request. If no, the process may continue with Operation 224.

Per Operation 210, when the request is not an R-CMS request, the process may include determining whether the request is a limited common mobile services request (an "L-CMS"). If yes, the process may proceed to Operation 212, otherwise the process may proceed to Operation 216.

Per Operation 212, the process may include providing the requested L-CMS. The providing of the L-CMS may involve activation of other mobile device 102 components, system 100 components and otherwise. For example, and not by limitation, when the L-CMS requests time clock verifications, the GPS component may be activated to provide accurate timing information.

Per Operation 214, the process may include determining whether the need for the L-CMS has ended or continues. If the need continues, the process may continue at Operation 212. If the L-CMS need has ended, the process proceeds to Operation 208.

Per Operation 216, when the request is not an R-CMS or an L-CMS request, the process may include determining whether the request is an unlimited common mobile services request (an "UL-CMS"). If yes, the process may proceed to Operation 218, otherwise the process may proceed to Operation 224.

Per Operation 218, the process may include determining whether an authenticated SIM is present in the mobile device. Such determinations may include any known techniques for verifying a SIM is authenticated for use in a given mobile device and/or with a WC 140 that is within range of the mobile device 102. The SIM may be provided in any form, such as a physical SIM card or as a virtual eSIM. One or more SIMs may be provided for use in the mobile device 102 and operation 218 may include identifying which of such two or more SIMs are to be utilized for the requested UL-CMS. For at least one implementation, two or more SIMs may be utilized for a given UL-CMS at any given time. If an authenticated SIM is present in the mobile device 102, the process may proceed to Operation 220, otherwise, the process may proceed to Operation 208.

Per Operation 220, the process may include providing the requested UL-CMS.

The providing of the UL-CMS may involve activation of other mobile device 102 components, system 100 components and otherwise. One or more of the various implementations of the present disclosure may be configured for use in facilitating any given UL-CMS request.

Per Operation 222, the process may include determining whether the need for the UL-CMS has ended or continues. If the need continues, the process may continue at Operation 220. If the UL-CMS need has ended, the process proceeds to Operation 208.

Per Operation 224, which may be reached for at least one non-limiting example via either Operation 208 and/or Operation 216, the process may include determining whether a request is for a selected mobile service (an "SMS" request). If so, the process may continue, as shown in FIG. 3, otherwise, the process may proceed to Operation 226, powering down of the mobile device 102 into a given operating or non-operating state, such as an idle or power saving state.

It is to be appreciated that the process flow shown in FIG. 3 and discussed above are for illustrative purposes and is not to be considered limiting an implementation of the present disclosure or an implementation thereof to any specific sequence of operations.

Selected Mobile Service (SMS) Engine (108)

For at least one implementation, the processor 104 may be configured to implement computer instructions for a SMS engine 108, such instructions may also and/or alternatively be implemented by a dedicated or separate processing component.

For at least one implementation, the SMS engine 108 provides the mobile device 102 with capabilities of dynamically configuring the mobile device 102 based upon locally and/or remotely stored mobile application data and mobile user data. The mobile application data may be stored in the LDS 116, for example, as local mobile app data ("LMAD") and in a local MAD data store (LMADDS) 122 and/or as stored remotely, in the RMDDS 116, as remote mobile app data ("RMAD") 162. The mobile user data may be stored locally, as local MUD ("LMUD"), in the local MUD data store (LMDDS) 122 and remotely, as remote mobile user data ("RMUD"), in the RMDDS 164.

For at least one implementation one or more data and/or instructions identified as LMAD and/or LMUD data/instructions may be non-transiently stored in the LDS 116 and used by the mobile device 102 while a first given user is recognized by the mobile device 102 and/or by the WC 140 as a then arising current user of the mobile device 102. For at least one implementation, one or more data and/or instructions identified as RMAD and/or RMUD data/instructions may be non-transiently stored by the RMDDS 160 and accessed by the mobile device 102 on an as-needed, on-demand, periodic, scheduled, or other basis.

By storing the RMAD 162 and RMUD 164 in the RMDDS 160, the mobile device 102 may be configurable for use in a virtualized implementation. As used herein, a "virtualized implementation" refers to a use of a mobile device 102 wherein one or more application programs and/or features, functions, data sets, services or the like therein (herein individually and collectively, "application programs" and excluding user interface aspects of the application program) are executed by a remote processor (where, "remote" here refers to a processor not physically provided on the mobile device 104) and outputs of the applications are presented to a user of the mobile device 102 as if the applications themselves are being executed by the mobile device 102 processor 104.

A virtualized implementation facilitates portability of a given mobile device 102 between multiple users and facilitates efficient use of the mobile device 102 upon a user signing in with a remote service facilitating such virtualized implementation. For a non-limiting example, a virtualized implementation of a Solitaire game (an example of a SMS), the computer instructions utilized to facilitate the Solitaire game play may be executed by the WC 140, or another processor coupled thereto, such as a Cloud based processor, while the mobile device 102 communicates user inputs to and receives humanly perceptible updates to the gameplay (as perceivable by the user via an internal user I/O device 130 and/or an external user I/O device 132) from the WC 140 (and/or other processor). For such an implementation, data processing operations of the mobile device 102 may be reduced to receiving and communicating user inputs to the server and receiving from the server and presenting to the user, information in a humanly perceptible format.

By using a virtualized implementation, a first user's Solitaire game preferences may be presented to the first user of the mobile device 102 without requiring a download to the mobile device 102 of application instructions and/or data, other than any MAD and/or MUD, and without the mobile device 102 executing the instructions not facilitating user input/output aspects of the SMS for the Solitaire game. Humanly perceptible information which reflects a state of the Solitaire gameplay, such as game style chosen, past scores, user settings, or the like is communicated to the mobile device 102 and presented by the mobile device 102 while the non-MAD data used to facilitate the Solitaire game are executed by the WC 140 or a remote processor. Likewise, a second user's Solitaire game preferences may be presented to a second user of the mobile device 102 and without needing a download to the mobile device 102 other than one or more of elements of MAD and/or MUD used to facilitate user interaction with the application program-here, the Solitaire gameplay. Thus, it is to be appreciated that by utilizing virtualized implementations of mobile device applications, a given mobile device 102 is readily portable and capable of use by different users upon an identification of the then occurring user to the WC 140. With virtualized implementations, transfers of a mobile device 102 between two or more users can occur without delays otherwise incurred to download data other than MADs and/or MUDs, such downloads otherwise needing to occur before the mobile device 102 is configured for use with a given application. It is to be further appreciated that virtualized implementations can result in considerable time savings when a new mobile device 102 is to be used by a given user, when a given user commonly utilizes multiple applications having large non-MAD and/or non-MUD data sets.

For at least one implementation, a mobile device 102 may be configured to facilitate virtualized implementations and actualized implementations of applications. For an actualized implementation, MAD, non-MAD, MUD, and non-MUD data, for a given application may be stored as LMAD 122 and LMUD 124 data in the local data store 116 for a given mobile device 102. A non-limiting example of an "actualized implementation" of a Solitaire game may occur by the processor 104, on a given mobile device 102, executing computer instructions stored thereon, e.g., in the local data store 116 as LMAD, which result in a presentation of the Solitaire game and facilitate such game play on a user interface for the mobile device 102 itself even when the mobile device 102 is not coupled to a WC 140. User settings may be obtained from the LMADDS 122. For an actualized implementation of an application, the mobile device 102 downloads (if not already provided therewith) and executes computer instructions, e.g., MAD, non-MAD and using MUD and non-MUD data (which may also be downloaded) to provide the Solitaire gameplay. An actualized implementation of an application may include an exchange of information with the WC 140 (and other Cloud or otherwise based elements), and one or more of the computer instructions, MAD, non-MAD, MUD and non-MUD data used for the actualized implementation.

Further, when a second user seeks to use a mobile device 102 configured for an actualized implementation of an application with a first user, such second user commonly needs to reconfigure the mobile device 102 for use by the second user. Such reconfiguring may include an inputting (and/or downloading) of the second user's settings, their application settings, and/or the like before the actualized implementation of the application may occur and be ready for use by the second user. Thus, an actualized implementation of an application commonly results in download, execution and other delays that a virtualized implementation of the same application does not incur.

As shown in FIG. 3, operations performed by a SMS engine 108, for at least one implementation of the present disclosure may begin, as per FIG. 2, when a request provided to a mobile device is not a CMS request, as illustrated by Operation 300.

Per Operation 302, the process may include verifying an authenticated SIM is present in the mobile device 102. If the SIM is not authenticated or a SIM is not present in the mobile device 102, the process continues, per Operation 304. If the SIM is authenticated, the process continues with Operation 308.

Per Operation 304, the process may include receiving new SIM data. The new SIM data may be associated with a new account with a given WC 140 or may link an existing account with a first WC 140 to an account with a new WC 140. For example, a traveling user traveling internationally may desire to use a "burner" or unlocked phone and purchase a SIM card when arriving at their international destination. The new SIM card may not be associated with any user information and thus the process of receiving new SIM data, per Operation 304, may include a user identifying themselves by one or more identifiers as being associated with the SIM. The new SIM may be for pre-paid minutes or otherwise. The traveling user may further desire to associate their new SIM, and hence the mobile device 102 as configured to operate at the international destination, with an existing WC 140 account, such as an account with their home or origination location. Based upon the new SIM data, the process continues with the new SIM data being authenticated, per Operation 302.

Per Operation 306, if new SIM data is not received within a given time period or an attempt threshold for providing authenticatable SIM data or another operation has been reached, the process continues, per Operation 307, with a return to FIG. 2, Operation 202. For other implementations, the process may terminate or proceed at another operation identified in FIG. 2 or otherwise. The time limit and/or the number of attempts threshold may be pre-determined, then determined, variable, set by a given WC 140, set by a given user associated with a SIM and a wireless or other data account, or otherwise.

Per Operation 308, the process may include authenticating a user. During user authentication, permissions and/or conditions (if available) governing a given user's use of a SMS feature or function may be determined. For at least one implementation, a user of the mobile device 102 may or may not be associated with an account owner, as identified by SIM data. For example, SIM data may identify a mobile device 102 as being authorized for use on a given network and identifying a user, such as a parent, subscribing to the service (when included for a given WC 140) without identifying a user, such as a child, of the authenticated SIM mobile device 102. Per Operation 308, the process includes authenticating a user such that the user's MAD and MUD may be appropriately accessed and virtualized implementations of one or more applications presented on the mobile device 102. When the user of the mobile device 102 is not authenticated, the process continues with Operation 310. When the user of the mobile device 102 is authenticated, the process continues with Operation 324.

Per Operation 310, the process may include determining whether an unauthenticated user, as determined per Operation 308, is a new or temporary permitted user. It is to be appreciated that a user of a given mobile device may be "new" in that they currently desire to use the mobile device and are likely to desire to use the mobile device at another later time, or the user may be "temporary" in that the desire to use the mobile device at or about the current time. For example, a user without an operative mobile device may temporarily desire use of another person's mobile device to contact a friend or a tow truck when their car breakdown and thus may be considered a "temporary" user. A child being granted, for a first time, use permissions and/or new usage permissions of a given mobile device, may be a "new" user with respect to a given service and/or two or more services provided by such mobile device. Further, the process may include verifying that the "new" or "temporary" user is permitted to use the mobile device. Such verification may include entry of a passcode, a password, a second device authentication, two-factor authentication, or otherwise. Such authentications may be provided by a user associated with an account associated with the authenticated SIM. When the unauthenticated user is not permitted to use the mobile device, with respect to any use and/or with respect to uses of one or more SMS request, the process may continue with Operation 312, otherwise, the Operation may continue with Operation 314.

Per Operation 312, the process may include rejecting the SMS request when the new/temporary user is not verified to be permitted to use the mobile device 102 for the SMS requested. It is to be appreciated that a permitted user may be a "new" user with respect to a given SMS or an application associated with a given SMS. For example, a child may be a permitted user for making phone calls and not permitted to utilize social media applications or the like. The process may then proceed to Operation 306, as discussed above.

Per Operation 314, the process may include receiving from the new/temporary user MAD data, if any, associated with the SMS requested. For at least one implementation, the MAD data may be obtained from and/or provided by any source, may be generic to multiple users, may be user specific, or otherwise.

Per Operation 316, the process may include storing the MAD data for the new/temporary user in the RMDDS 160 and/or in the RMADDS 162. The RMAD may include instructions common to multiple users and instructions specific to the new/temporary user.

Per Operation 318, the process may include receiving from the new/temporary user MUD data, if any, associated with the SMS requested. For at least one implementation, the MUD data may be obtained from and/or provided by any source, may be generic to multiple users, may be user specific, or otherwise.

Per Operation 320, the process may include storing the MUD data for the new/temporary user in the RMDDS 160 and/or in the RMUDDS 164. The RMUDDS 164 may include data common to multiple users and data and instructions specific to the new/temporary user.

Per Operation 322, the process may include identifying a source of MAD and MUD to use to fulfill the SMS request. It is to be appreciated that the data and instructions used for fulfilling a given SMS request may be stored locally and/or remotely. For example, a parent using their mobile device may store their MAD and MUD in the local data store 116, such that the data is readily accessible, while a child user of the mobile device may have their MAD and MUD stored by the RMDDS 160.

Per Operation 324, the process may include retrieving and/or storing data as LMAD/LMUD and/or RMAD/RMUD data from/to, respectively, the local data store 116 and the RMDDS 160. Operation 324 may occur in conjunction with Operation 322, at any time during the process. For at least one implementation, and regarding LMAD and/or LMUD, the data may not be available on a given mobile device 102 for one or more users while being available for another user.

For example, when users of a mobile device 102 change from a first user to a second user, LMAD and/or LMUD data for the first user may be stored on the mobile device 102 while LMAD and/or LMUD data for the second user is not stored on the mobile device 102. When the mobile device 102 is configured for use by the second user, one or more data sets of the previously stored LMAD/LMUD data, for the first user, may persist, be deleted, or otherwise managed by a file system associated with the local data store 116. The storing of LMAD and/or LMUD data on a given mobile device 102 may occur on an as-desired, temporary, as included, as specified, permanent, default or other basis and may vary based on a user identifier, available storage, available mobile device capabilities, and otherwise. For at least one implementation, LMAD and LMUD data is additionally stored on the RMDDS 160, respectively, in the RMADDS 162 and the RMUDDS 164. The storing of such data on the RMDDS 160 may occur periodically, as data is changed, as new data is added, or otherwise.

For example, an application requiring a given technology, for example, 8K video processing, may not be stored on a given mobile device when one or more data processors, or other components are not also provided on the mobile device—it being appreciated that storing data for the 8K video application would be ineffectual given the absence of the related underlying technologies used for 8K video presentation, processing and otherwise.

Per Operation 326, the process may include retrieving RMAD and/or LMAD data for the requested SMS. The RMAD may be retrieved from the RMDDS 160, the server(s) 170, or otherwise. The LMAD may be retrieved, when available, from the local data store 116. For at least one implementation, the LMAD and/or RMAD may include one or more of: virtualization data, which may be used to virtualize a presentation and use of an application on a given mobile device 102; application data, which may be used to facilitate a feature or function of a given application; security data, which is used to secure communications between a mobile device 102 and the server(s) 170; and other data, which may be used for any other purpose. For example, an online banking application may include use of MAD virtualization data which instructs the mobile device 102 to present a virtualization of a user interface such as a deposit screen, a current accounts screen, and the like. The online banking application may also include use of MAD application data which facilitates one or more online banking activities, for example, depositing of a check by allowing permissions to use a camera on the mobile device 102. The online banking application may also include use of MAD security data which secures communications of confidential data by and between the mobile device 102 and one or more server(s) 170 providing the online banking service.

Per Operation 328, the process may include retrieving RMUD and/or LMUD (when available) for the requested SMS. The MUD may be retrieved from the RMDDS 160, the server(s) 170, the local data store 116, or otherwise. For at least one implementation, MUD retrieved may be associated with the MAD for the requested SMS. For example, the online banking application may include MUD data that identifies user account numbers, password settings, or otherwise. Such MUD data may be provided to the mobile device 102 and/or the server(s) 170 used to facilitate the requested SMS. For an implementation, MUD retrieved may include data that is generic to a given user and may or may not be associated with a given MAD. For example, MUD may include a user contact list, a user home location, or the like-information useful in facilitating an online banking experience that also includes an in-person banking experience, such as when a given user is to visit a bank's physical branch or home location.

Per Operation 330, the process may include communicating a virtualized application to the mobile device 102 that has requested the SMS. The virtualized application, as communicated, may include one or more MAD and MUD data sets retrieved per Operations 324 and 326. The virtualized application may provide a representation of an application that, absent implementations of the present disclosure, would commonly require a mobile device 102 to load and execute an application program that is associated with the given SMS. In accordance with implementations of the present disclosure, the server(s) 170 implements such application programs.

Per Operation 332, the process may include awaiting receipt of a user input. The user input may be communicated to the server(s) 170 for one or more data processing operations with virtualized representations of such data processing operations being communicated, in a return path, to the mobile device 102 for presentation thereby to the user. It is to be appreciated that per at least one implementation, the processes of the present disclosure may facilitate virtualized use of any application, service, technologies or otherwise which is compatible with a mobile device compatible presentation of information for such application to a user of the mobile device 102. Accordingly, it is to be appreciated that SMSs supported by a given implementation of the present disclosure may be limited by the internal user I/O devices and/or external user I/O devices compatible with the given mobile device 102 and any communications limitations of communications links coupling the mobile device to one or more of the WC 140, RMDDS 160, and/or the server(s) 170. When a mobile device 102 is configured for use with 5G compatible communications links, it is to be appreciated that applications supported by implementations of the present disclosure may be limited by capabilities of the internal user I/O devices 130 and/or external user I/O devices 132 that are compatible with a given mobile device 102. When a user input is received, the process may continue with Operation 334. When a user input is not received, the process may continue with Operation 340. It is to be appreciated that a given SMS may involve or not involve user inputs. For example, a streaming video SMS may not involve user inputs, while another SMS may necessarily involve receipt of user inputs, such as for an online banking application.

Per Operation 334, when a user input is received, the process may include one or more update and/or implementation operations (shown in parallel, although they may occur in serial, or otherwise and respectively as Operations 334A and 334B). For at least one implementation, Operations 334A/B may occur when a user of the mobile device 102 is authorized to perform a given SMS function. For example, a first user may be authorized to transfer funds between bank accounts while a second user may be authorized to view account balances and not transfer funds. Whether a given user is authorized to perform a given SMS function may be specified in the retrieved MUD. As shown by Operation 334A, the process may include updating RMAD and/or RMUD based upon the user input. For at least one implementation, RMAD and/or RMUD is updated whenever a user input, action or operation is requested by the mobile device 102, and such requested action or operation is performed by a server 170, and results in a change to RMAD and/or RMUD. For example, a bank account balance, as virtually represented to the user of the mobile device 102 may be updated to reflect a new balance following a funds transfer or other activity, with such updates being reflected in an update to account balance(s), stored as RMUD. As shown by Operation 334B, the process may include acting upon the user input, for example, by the server(s) 170 performing the requested funds transfer.

Per Operation 336, the process may include determining whether to store one or more changes to the RMUD and/or RMAD, based upon the user input or otherwise, locally on the mobile device 102, such as in the local data store 116.

Per Operation 338, the process may include storing of one or more of the RMAD/RMUD, respectively, as LMAD/LMUD. The storage of data a LMAD/LMUD may be for any given period, operating condition (such as while a given SMS is being implemented), user, or otherwise. If stored locally, changes may be stored in the LMADDS 122 and/or the LMUDDS 124. It is to be appreciated that a user input may apply to one or more SMSs and/or CMSs. For example, a modification of a user's contact information may be ubiquitous across multiple SMSs and/or CMSs. If the one or more changes to the MAD/MUD are to be stored locally, then such storage occurs per Operation 338. Otherwise, the process may continue with Operation 340.

Per Operation 340, the process my include determining whether a time limit or other constraint (herein illustratively and not by limitation, "a time limit") has been reached, or other operating constraint realized. The time limit may be random, SMS specific, mobile device specific, user specific, time of day, or otherwise. For example, a streaming video SMS for a child user of the mobile device 102 may be limited by time of day, elapsed time used during a given SMS request, total time used over a given period, user age, user location, day of week, a content rating, or otherwise. When a time limit is reached, the process may continue with Operation 307 and a return to operations of FIG. 2. When a time limit has not been reached, the process may continue with Operation 342.

Per Operation 342, the process may include continuing to execute/provide the requested SMS.

Accordingly, it is to be appreciated that implementations of the present disclosure facilitate the providing of one or more SMSs, on/by/with a mobile device 102 and without use of one or more components of an application, user, data, or otherwise that commonly available mobile devices 102 utilize today to provide the one or more SMSs. It is also to be appreciated that multiple instances of the CMS engine 106 and the SMS engine 108 may be instantiated on a mobile device 102 at any given time such that multiple CMS and/or SMS services may be provided to a user of the mobile device 102 at a given time. For example, a streaming video SMS service may be provided while a calendaring SMS service and a telephone CMS service are also facilitated, by one or more corresponding virtualizations, on the given mobile device 102.

It is to be appreciated that the process flow shown in FIG. 3 and discussed above are for illustrative purposes and is not to be considered limiting an implementation of the present disclosure or an implementation thereof to any specific sequence of operations.

Interface (110)

Referring again to FIG. 1, for at least one implementation of the present disclosure, a mobile device 102 may include an interface 110. The interface 110 may include one or more user I/O modules 112 which couple the mobile device with the internal user I/O devices 130 and/or to the external user I/O devices 132.

The user I/O module 112 is a common hardware component that is used in many known computing devices to facilitate communications between a processor and a peripheral device, such as the internal user I/O device(s) and/or the external user I/O devices 132. A person having ordinary skill in the art (a "PHOSITA") appreciates that a given I/O module 112 will be configured for use with a particular I/O device and a given form of information to be presented to or received from a user of the mobile device 102. Accordingly, the ordinary meaning of an "input/output module," is expressly adapted herein and is one that a PHOSITA would know and understand recites structure based upon the type(s) of data to be communicated using a given I/O modules. Non-limiting examples of such ordinary meaning are further informed by the use of "input/output module" by college instructors, professors, and others to refer to specific hardware. These teachings are demonstrated, for example and not by limitation, in papers published on, at least, the following websites: http://aturing.umcs.maine.edu/~meadow/courses/cos335/COA07.pdf; http://www.ccs.csun.cdu/~cputnam/Comp546/Input-Output-Web.pdf; and https://faculty.etsu.edu/tarnoff/ntes4717/week_06/IO.ppt; the contents of which are incorporated herein by reference. Further, the I/O module 112 may use any known or later arising technologies for communicatively coupling a mobile device 102 with an internal or external I/O device 130/132 respectively.

The interface 110 may also include a network interface card (NIC) 114 or similar hardware and software which facilitate coupling of the mobile device 102 with the WC 140 and/or other external devices, networks, systems, and the like. Non-limiting examples of NICs include those configured for use with one or more of the BLUETOOTH, ZIGBEE, Near Field Communications, Narrowband IoT, WIFI, 3G, 4G, 5G, cellular, and other currently arising and/or future arising communications, networking, data processing and related technologies. Any known or later arising networking and/or other communications technologies may be used to facilitate direct and/or indirect communications between a mobile device 102 and the WC 140 or other external devices, systems or the like For at least one implementation, the NIC 114 may be configured to operate as a software defined radio. When so configured, the interface 110 may use licensed and/or unlicensed frequencies to facilitate one or more CMS and/or SMS services.

For at least one implementation, the NIC 114 may be configured to include one or more data ports for establishing connections between a mobile device 102 and another device as a laptop computer, a smartphone, a satellite or cable set top box (an "STB") or other device. Such data ports may support any known or later arising technologies, such as USB 2.0, USB 3.0, ETHERNET, FIREWIRE, HDMI, wireless technologies, and others. The NIC 114 may be configured to support the transfer of data formatted using any protocol and at any data rates/speeds. The NIC 114 may be connected to one or more antennas (not shown) to facilitate wireless data transfers. Such antenna may support short-range technologies, such as 802.11a/c/g/n and others, and/or long-range technologies, such as 4G, 5G, and others. The NIC 114 may be configured to communicate signals using terrestrial systems, space-based systems, and combinations thereof. For example, a mobile device may be configured to receive global positioning ("GPS") signals from a satellite directly or otherwise.

Local Data Store (116)

For at least one implementation, a mobile device 102 may include one or more local data stores(s) 116. Computer instructions, computer data, LMAD, LMUD, and/or other data and information (collectively herein, "stored data") may be stored by the local data store 116. The local data store 116 may be used by the processor 104 and/or other system hardware and/or software components to provide one or more features and/or capabilities of the various implementations of the present disclosure. For example, the processor 104 may be configured to execute, use, implement, modify or otherwise process such stored data. The local data store 116 may be configured using any known or later arising data storage technologies. In at least one implementation, the local data store 116 may be configured using flash memory technologies, micro-SD card technology, as a solid-state drive, as a hard drive, as an array of storage devices, or otherwise. The local data store 116 may be configured to have any data storage size, read/write speed, redundancy, or otherwise. The local data store 116 may be configured to provide temporary/transient and/or permanent/non-transient storage of stored data, as the case may be. Stored data may be encrypted prior to and/or at the time of storage, with decryption of such stored data occurring, as included, for use by processor 104, or otherwise.

The local data store 116 may include one or more databases and/or data stores providing information, instructions and/or data for using in an implementation including, but not limited to, the LMADDS 122 and the LMUDDS 124. For at least one implementation, such databases may also include a user preferences database, a history database, and a support database. Other databases may be provided for other implementations.

User Preference Database (134)

For at least one implementation, information pertaining to a user and/or a population of users (where a population of users is two or more users) may be provided by a user preference database 134. The local data store 116 may be configured to collect and provide data relating to one more user's preferences. The user preferences database 134 may include any information that may be and/or is useful in supporting one or more user circles. Non-limiting examples of such preferences may include demographic, psychographic, geographic, or other types of information pertaining to a user. The breadth and scope of such types of information, and the degree of specificity and/or anonymity and/or generality associated therewith, is not limited and may vary. Any source of information may be used in populating the user preferences database 134. Preference information may be populated based on user behavior, user input, mobile device type, or otherwise. For at least one implementation, the user preferences database 134 may be provided as a sub-set of the LMUDDS 124. For another implementation, the user preferences database 134 may be provided separately and may be used to specify overall preferences, limitations and the like for use of a given mobile device 102. Such overall preferences, limitations, and the like may be specified by the user authenticated by a SIM, or otherwise, and may apply to any user of the mobile device 102.

Support Database 136

For at least one implementation, a support database 136 may be configured to collect and provide data relating to one or more functions provided by a given mobile device 102 The support database 116 may be configured to provide support features, such as tutorials or the like, which provide support for requested CMSs and/or SMSs.

Other Databases 138

For at least one implementation of the present disclosure, the local data store 116 may include the use, on a transient or non-transient basis, of the other databases 138. The stored data in the other databases 138 being provided for execution and/or use, singularly or collectively, by the processor 104. Any type of stored data and associated computer instructions implemented for use of such stored data may be provided.

Security Chip (127)

For at least one implementation, a mobile device 102 may include a security chip 127. Security chips 127 are well known in the art and non-limiting examples include the TITAN M™ used on the Google Inc. PIXEL™ mobile phone, the SECURE ENCLAVE™ provided on Apple Inc. smartphones, the TRUSTZONE™ provided by ARM, Inc. and others. The security chip 127 may be configured to address security needs, including securing the identify of users, securing content communicated via a given link, securing access to a given CMS and/or SMS, and other security needs. The security chip 140 may operate separately and/or in conjunction with security components provided by other components of the mobile device 102 and/or of the system 100 including those provided by WCs 140, RMDDS 160, server(s) 170, and otherwise. Any known or later arising security technologies, protocols, approaches, schemes, or otherwise may be used in one or more implementations of the present disclosure by the security ship 127.

Internal User I/O Devices 130 and External User I/O Devices 132

For at least one implementation, one or more internal user I/O devices 130 and/or external user I/O devices 132 may be configured to support the communication of information and data by and between a user and a mobile device 102. Non-limiting examples of such information and data (herein, "I/O") include data and information presented to and/or by a user in an audio, visual, text, gesture, and/or other format.

Audio I/O: Audio I/O may include spoken text, sounds, or any other audible information. Such audible information may include one or more of humanly perceptible audio signals, where humanly perceptible audio signals typically arise between 20 Hz and 20 KHz. For at least one implementation, the range of humanly perceptible audio signals may be configurable to support an audible range of a given individual user.

For at least one implementation, an audio I/O generally includes hardware and software (herein, "audio technologies") which supports the input by and output to a user of audible signals. Such audio technologies may include technologies for converting human speech to text, text to speech, translation from a first language to one or more second languages, playback rate adjustment, playback frequency adjustment, volume adjustments and otherwise. Non-limiting examples of audio technologies that may be utilized in an audio I/O include GOOGLE VOICE, SFTRANSCRIPTION, BRIGHTSCRIPT, GOOGLE ASSISTANT, SIRI, and others.

In at least one implementation, an audio I/O may be configured to use one or more microphones and speakers to capture and present audible information to user. Such one or more microphones and speakers may be provided by a given mobile device or by a device communicatively coupled to an audible device component, for example, earbuds may be communicatively coupled to a mobile device, with the earbuds functioning as an audio external user I/O device that captures and presents audio sounds from and to a user. Accordingly, it is to be appreciated that any existing or future arising audio I/O devices, systems and/or components may be utilized by and/or in conjunction with a mobile device 102.

Visual I/O: For at least one implementation, a mobile device 102 may include a visual I/O configured to support the providing of visible signals between a user and a mobile device 102. Such visible signals may be in any form, such as still images, motion images, augmented reality images, virtual reality images and otherwise. Such visible information may include one or more of humanly perceptible visible signals. For at least one implementation, a visual I/O may also be configured to capture non-humanly visible images, such as those arising in the X-ray, ultra-violet, infra-red or other spectrum ranges. Such non-humanly visible images may be converted into humanly visibly perceptible images by a mobile device 102 using an CMS and/or an SMS service.

For at least one implementation, a visual I/O generally includes hardware and software (herein, "visible technologies") which supports the input by and output of visible signals to a user. Such visible technologies may include technologies for converting images (in any spectrum range) into humanly perceptible images, converting content of visible images into a given user's perceptible content, such as by character recognition, translation, playback rate adjustment, playback frequency adjustment, and otherwise.

A visual I/O may be configured to use one or more display devices configured to present visible information to user. A visual I/O may be configured to use one or more image capture devices, such as those provided by lenses, digital image capture and processing software and the like which may be provided by a given mobile device 102 itself or by a communicatively coupled additional image capture device component, for example, a remote camera in a vehicle or otherwise-such remote camera being one, non-limiting example of an external user I/O device 132. Any existing or future arising visual I/O devices, systems and/or components may be utilized by and/or in conjunction with a mobile device 102 to facilitate the capture, communication and/or presentation of visual information in conjunction with a CMS and/or an SMS service.

Text I/O: For at least one implementation, a mobile device 102 may include a text I/O configured to support the providing of textual information by a user using a mobile device 102. The textual information signals may be in any language, format, character set, or otherwise. Textual information may include one or more of humanly perceptible characters, such as letters of the alphabet or otherwise. A text I/O may be configured to capture textual information in first form, such as a first language, and convert such textual information into a second form, such as a second language.

A text I/O generally includes hardware and software (herein, "textual technologies") which supports the input by and output of textual information signals to a user. Such textual technologies may include technologies for inputting, outputting, and converting textual content into a given user's perceptible content, such as by character recognition, translation, size/font adjustment, and otherwise. In at least one implementation, a text I/O may be configured to use an internal user I/O device 130 and/or an external user I/O device 132 with non-limiting examples including keyboards, touch pads, mice, and/or other devices configured to capture textual information. It is to be appreciated that any existing or future arising text I/O devices, systems and/or components may be utilized by and/or in conjunction with a mobile device 102 to facilitate CMS and/or SMS services.

Gesture I/O: For at least one implementation, a mobile device 102 may include a gesture I/O configured to support the providing of gesture information, such as sign language, by a user using a mobile device 102. Gesture information signals may be in any form or format. Gesture information may include one or more of humanly perceptible characters, such as those provided by sign language. The gesture I/O may be configured to capture a user's motions to control one or more aspects of a mobile device 102 and/or one or more CMS and/or SMS services. Non-limiting examples of such motions include those commonly used on smartphone touch interfaces.

A gesture I/O generally includes hardware and software (herein, "gesture technologies") which supports the input by and output of gesture information signals to a user. Such gesture technologies may include technologies for inputting, outputting, and converting gesture content into any given form, such as into textual information, audible information, visual information, device instructions or otherwise. In at least one implementation, a gesture I/O may be configured to use an internal user I/O input device 130 and/or an external user I/O device 132 with non-limiting examples including a motion detecting camera, a touch pad, a mouse, a motion sensor, or another device or collection of devices configured to capture motion information.

It is to be appreciated that any existing or future arising gesture I/O devices, systems and/or components may be utilized by and/or in conjunction with a mobile device 102 to facilitate the use of gesture information with one or more CMSs and/or SMSs.

Geo-Positioning System Chip (129)

For at least one implementation, a mobile device 102 may include a geo-positioning system (GPS) chip 129 configured to identify a position of a given mobile device 102. The GPS chip 129 may be configured to use any device position determining technology, including global positioning technologies, IP addressing, user input (e.g., a user inputs their location by use of any user compatible input format), or otherwise. Position information generated and/or captured by the GPS chip 129 may be utilized by the processor 104 to facilitate use of CMSs and/or SMSs.

Wireless Component (140)

As shown in FIG. 1, the system 100 may also include one or more of the wireless component (WC) 140. Non-limiting examples of the WC 140 include network storage devices, network processors, cellular towers, network support system, and otherwise.

Wireless Data Store: For at least one implementation, a WC 140 may include a wireless data store. The wireless data store may be provided via any wireless and/or networked devices and/or systems, such as those communicatively accessible via 3G/4G/5G systems, the Internet, or other communications and/or networking technologies including local, regional, private, public or other networking technologies. It is to be appreciated that the wireless data store may be referred to herein as a data store, which is a combination of known hardware and software, and may be configured using any known or later arising data storage technologies. In at least one implementation, a wireless data store may be configured using flash memory technologies, micro-SD card technology, as a solid-state drive, as a hard drive, as an array of storage devices, or otherwise. A wireless data store may be configured to have any data storage size, read/write speed, redundancy, or otherwise. A wireless data store may be configured to provide temporary/transient and/or permanent/non-transient storage of one or more data sets, computer instructions, and/or other information.

Wireless Processor: For at least one implementation, one or more wireless processors may be configured to execute computer instructions which facilitate coupling of a mobile device 102 with the RMDDS 160 and/or the server(s) 170. A wireless processor may use any known or later arising network and/or server based technologies. The wireless processor may be configured to support and/or perform, separately and/or in conjunction with one or more of the RMDDS 160 and/or the server(s) 170, one or more computer instructions utilized in facilitating one or more CMSs and/or SMSs.

Although various implementations have been described above with a certain degree of particularity, or with reference to one or more individual implementations, those skilled in the art could make alterations to the disclosed implementations without departing from the spirit or scope of the claim. The use of the terms "approximately" or "substantially" means that a value of an element has a parameter that is expected to be close to a stated value or position. As is well known in the art, there may be minor variations that prevent the values from being exactly as stated. Accordingly, anticipated variances, such as 10% differences, are reasonable variances that a person having ordinary skill in the art would expect and know are acceptable relative to a stated or ideal goal for one or more implementations of the present disclosure. It is also to be appreciated that the terms "top" and "bottom," "left" and "right," "up" or "down," "first," "second," "next," "last," "before," "after," and other similar terms are used for description and ease of reference purposes and are not intended to be limiting to any orientation or configuration of any elements or sequences of operations for the various implementations of the present disclosure. Further, the terms "coupled," "connected" or otherwise are not intended to limit such interactions and communication of signals between two or more devices, systems, components or otherwise to direct interactions; indirect couplings and connections may also occur. Further, the terms "and" and "or" are not intended to be used in a limiting or expansive nature and cover any range of combinations of elements and operations of an implementation of the present disclosure. Other implementations are therefore contemplated. It is intended that matter contained in the above description and shown in the accompanying drawings shall be interpreted as illustrative of implementations and not limiting. Changes in detail or structure may be made without departing from the basic elements of this disclosure as defined in the following claims.

Further, a reference to a computer executable instruction includes the use of computer executable instructions that are configured to perform a predefined set of basic operations in response to receiving a corresponding basic instruction selected from a predefined native instruction set of codes. It is to be appreciated that such basic operations and basic instructions may be stored in a data storage device and may be updateable and are non-transient as of a given time of use thereof. The storage device may be any device configured to store the instructions and is communicatively coupled to a processor configured to execute such instructions. The storage device and/or processors utilized operate independently, dependently, in a non-distributed or distributed processing manner, in serial, parallel or otherwise and may be located remotely or locally with respect to a given device or collection of devices configured to use such instructions to perform one or more operations.

The invention claimed is:

1. A mobile device comprising:

a processor; and a first data store, coupled to the processor, including first non-transitory computer executable instructions which, when executed by the processor, instruct the processor to instantiate a selected mobile services engine (SMSE);

wherein the SMSE, when instantiated by the processor, configures the mobile device to perform virtualized application operations comprising:

receiving, from a first user, a first request to use a selected mobile service (SMS);

wherein the SMSE facilitates a virtualized implementation of an application program associated with the SMS; and wherein the SMSE facilitates a provision of one or more features of the application program to the first user of the mobile device without having the mobile device download and execute the application program;

requesting an authentication of a subscriber identity module (SIM);

wherein the SIM is contemporaneously provided with the mobile device;

when the SIM is positively authenticated:

requesting an authentication of the first user; and when the first user is positively authenticated:

identifying one or more sources of mobile application data (MAD) and mobile user data (MUD), for the first user;

first retrieving the MAD and the MUD; and receiving a virtualized representation of the application program from a server coupled to the mobile device; and wherein, based on the MAD and the MUD, the server executes an actualized implementation of the application program to present at least one feature of the application program as a virtualized application to the first user.

2. The mobile device of claim 1, wherein the virtualized application operations further comprise:

receiving, from the first user, a user input directed to the virtualized application; and determining, based on the MUD, whether the user input is permitted.

3. The mobile device of claim 2, wherein, when the user input is permitted, the server implements the user input with respect to the actualized implementation of the application program; and wherein the virtualized application operations further comprise:

receiving, from the server, a virtualized result representative of an actual result of the actualized implementation of the user input by the server; and updating, based on the virtualized result, at least one stored instance of at least one of the MUD and the MAD.

4. The mobile device of claim 3, further comprising:

wherein the at least one stored instance of at least one of the MUD and the MAD respectively includes local MAD (LMAD) and local MUD (LMUD); and wherein the LMAD and the LMUD are stored in the first data store.

5. The mobile device of claim 4, wherein the at least one stored instance of at least one of the MUD and the MAD respectively includes remote MAD (RMAD) and remote MUD (RMUD); and wherein the RMAD and the RMUD are stored in a remote mobile device data store coupled to the server.

6. The mobile device of claim 1, wherein the virtualized application operations further comprise:

communicatively coupling the mobile device with a wireless component (WC);

wherein the WC communicatively couples the mobile device with the server; and wherein the WC authenticates the SIM for the mobile device.

7. The mobile device of claim 1, wherein at least one condition governs use of the application program; and wherein the authentication of the first user is determined, by the server, in view of the at least one condition.

8. The mobile device of claim 7, wherein, when the first user is an adult user, the at least one condition permits authentication of the first user; and wherein, when the first user is a child user, the at least one condition inhibits authentication of the first user.

9. The mobile device of claim 7, wherein the authenticating of the first user is further determined, by the server, in view of at least one of the MAD and the MUD.

10. The mobile device of claim 1, wherein, when the SIM is not authenticated, the virtualized application operations further comprise:

receiving new SIM data;

wherein the new SIM data links an existing count with a first wireless component (WC) with a new account with a second WC;

receiving, from the first user, at least one identifier associating the first user with the SIM; and requesting authentication of the SIM based on the new SIM data and the at least one identifier.

11. The mobile device of claim 1, wherein, when the first user is not authenticated, the virtualized application operations further comprise:

determining if the first user is a new user or a temporary user;

when the first user is a new user or a temporary user, determining if the first user is permitted to use the mobile device;

when the first user is permitted to use the mobile device, receiving new user MAD;

non-transitorily storing the new user MAD;

receiving new user MUD; and non-transitorily storing the new user MUD.

12. The mobile device of claim 1, wherein the virtualized application operations further comprise:

communicatively coupling the mobile device with a wireless component (WC); and communicatively coupling the WC with a remote mobile device data store (RMDDS);

wherein the first data store is the RMDDS; and wherein the first retrieving includes retrieval of the MAD from the RMDDS.

13. The mobile device of claim 1, wherein the first data store is a local data store provided with the mobile device.

14. The mobile device of claim 1, wherein the virtualized application operations further comprise:

receiving a user input from the first user;

wherein the input is responsive to at least one of the features of the application program;

communicating the user input to the server; and determining whether to update the MAD based on at least one of the input and a result of an execution of the input by the server with respect to the application program.

15. The mobile device of claim 14, wherein the virtualized application operations further comprise:

obtaining the MUD from at least one of a local data store and a remote mobile device data store (RMDDS);

instructing the server to modify the MUD in view of the user input; and instructing the server to store modifications to the MUD in the RMDDS.

16. The mobile device of claim 15, wherein the virtualized application operations further comprise:

storing the the modifications to the MUD in the first data store.

17. The mobile device of claim 1, wherein the virtualized application operations further comprise:

receiving, from a second user, a second request to use the SMS;

authenticating the second user with the server executing the application program; and wherein the second authenticating identifies a condition governing use of the application program by the second user;

restricting use of the SMS by the second user when the condition restricts use of the SMS based upon a characteristic of the second user.

18. The mobile device of claim 17, wherein the characteristic of the second user includes a minimum age limit.

19. A computer readable medium non-transitorily storing computer executable instructions which, when executed by a processor in a mobile device, instruct the processor to instantiate a selected mobile services engine (SMSE) which configures the mobile device to perform virtualized application operations comprising:

receiving, from a first user, a first request to use a selected mobile service (SMS);

wherein the SMSE facilitates a virtualized implementation of an application program associated with the SMS; and wherein the SMSE facilitates a provision of one or more features of the application program to the first user of the mobile device without having the mobile device download and execute the application program;

requesting an authentication of a subscriber identity module (SIM);

wherein the SIM is contemporaneously provided with the mobile device;

when the SIM is positively authenticated:

requesting an authentication of the first user; and when the first user is positively authenticated:

identifying one or more sources of mobile application data (MAD) and mobile user data (MUD), for the first user;

retrieving the MAD and the MUD; and receiving a virtualized representation of the application program from a server coupled to the mobile device; and wherein, based on the MAD and the MUD, the server executes an actualized implementation of the application program to present at least one feature of the application program as a virtualized application to the first user.

20. A method comprising:

receiving, from a first user, a first request to use a selected mobile service (SMS);

wherein an SMS engine (SMSE), instantiated by a processor in a mobile device executing non-transitory computer instructions stored in the mobile device, facilitates a virtualized implementation of an application program associated with the SMS on the mobile device; and wherein the SMSE facilitates a provision of one or more features of the application program to the first user of the mobile device without having the mobile device download and execute the application program;

requesting an authentication of a subscriber identity module (SIM);

wherein the SIM is contemporaneously provided with the mobile device;

when the SIM is positively authenticated:

requesting an authentication of the first user; and when the first user is positively authenticated:

identifying one or more sources of mobile application data (MAD) and mobile user data (MUD), for the first user;

retrieving the MAD and the MUD; and receiving a virtualized representation of the application program from a server coupled to the mobile device; and wherein, based on the MAD and the MUD, the server executes an actualized implementation of the application program to present at least one feature of the application program as a virtualized application to the first user.

* * * * *